US006910296B2

(12) United States Patent
Blette et al.

(10) Patent No.: US 6,910,296 B2
(45) Date of Patent: Jun. 28, 2005

(54) LINE SPLICE USING BARB AND RECEIVER

(75) Inventors: Russell E. Blette, Hastings, MN (US); John E. Stark, Maplewood, MN (US); Jeffrey L. Wieringa, San Marcos, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/628,220

(22) Filed: Jul. 28, 2003

(65) Prior Publication Data

US 2005/0022441 A1   Feb. 3, 2005

(51) Int. Cl.[7] ............................................. F01K 91/00
(52) U.S. Cl. ..................................................... 43/43.1
(58) Field of Search ........................... 43/43.83, 42.49, 43/43.1; 403/280, 289, 282, 274; 24/614, 24/618, 619, 664

(56) References Cited

U.S. PATENT DOCUMENTS

| | | | | |
|---|---|---|---|---|
| 1,347,515 A | * | 7/1920 | Lutz ............................. | 24/663 |
| 2,465,064 A | * | 3/1949 | Colosimo ...................... | 43/42.09 |
| 2,552,248 A | * | 5/1951 | Zavod .......................... | 403/182 |
| 2,838,821 A | * | 6/1958 | Shur ............................ | 24/662 |
| 2,955,379 A | * | 10/1960 | Dell ............................ | 43/42.35 |
| 3,041,695 A | * | 7/1962 | Ouellette ...................... | 403/282 |
| 3,091,885 A | * | 6/1963 | Ulsh ........................... | 43/42.52 |
| 3,140,520 A | | 7/1964 | Marino et al. | |
| 3,148,423 A | * | 9/1964 | Anspach ....................... | 403/209 |
| 3,416,200 A | * | 12/1968 | Daddona, Jr. .................. | 24/662 |
| 3,551,963 A | * | 1/1971 | Mosher, Jr. et al. ........... | 24/618 |
| 3,717,907 A | | 2/1973 | Klein | |
| 3,722,130 A | * | 3/1973 | Handl ......................... | 43/44.98 |
| 3,734,551 A | * | 5/1973 | Hughes et al. ................ | 292/17 |
| 3,834,061 A | | 9/1974 | Klein | |
| 3,857,645 A | | 12/1974 | Klein | |
| 3,988,852 A | * | 11/1976 | Klein ......................... | 43/44.63 |
| 4,060,926 A | | 12/1977 | Cordell, Jr. | |
| 4,117,574 A | | 10/1978 | Yoshida | |
| 4,125,958 A | * | 11/1978 | Cote .......................... | 43/43.12 |
| 4,194,273 A | | 3/1980 | Williams | |
| 4,205,478 A | | 6/1980 | Emory | |
| 4,210,984 A | * | 7/1980 | Koenig ....................... | 24/697.2 |
| 4,369,551 A | | 1/1983 | Heredia | |
| 4,848,018 A | * | 7/1989 | Clarke ........................ | 43/43.12 |

(Continued)

FOREIGN PATENT DOCUMENTS

FR            2 441 572           6/1980

(Continued)

Primary Examiner—Teri P. Luu
Assistant Examiner—Jordan Lofdahl

(57) ABSTRACT

A splice system and method for linear connection of fishing lines include a female connector and a male connector. Each connector has first and second opposite ends and a longitudinal axis, about which the connector is symmetric. The first end of the female connector is connected to a first fishing line section and the second end has a first opening; the connector has an interior feature with a radial extent. The second end of the male connector is connected to a second fishing line section and the first end has a projection configured for coaxial insertion into the first opening of the female connector. The projection has a radial extent greater than the radial extent of the interior feature of the female connector. At least one of the connectors is resilient so that the projection compresses or the interior feature expands.

22 Claims, 6 Drawing Sheets

U.S. PATENT DOCUMENTS

| | | | |
|---|---|---|---|
| 5,143,500 A | * | 9/1992 | Schuring et al. ............ 411/339 |
| 5,157,861 A | * | 10/1992 | Peterson .................... 43/44.83 |
| 5,240,295 A | | 8/1993 | Spencer |
| 5,301,454 A | * | 4/1994 | Chen ......................... 43/42.74 |
| 5,469,606 A | * | 11/1995 | Hansen ....................... 24/662 |
| 5,469,652 A | * | 11/1995 | Drosdak .................... 43/44.83 |
| 5,647,103 A | * | 7/1997 | Foster ........................ 24/618 |
| 5,971,447 A | | 10/1999 | Steck, III |
| 2002/0139038 A1 | | 10/2002 | Frisco |

FOREIGN PATENT DOCUMENTS

| | | |
|---|---|---|
| FR | 2 578 150 | 9/1986 |
| JP | 04104751 | 4/1992 |
| JP | 04346737 | 12/1992 |
| JP | 09313080 | 12/1997 |
| JP | 2000312550 | 11/2000 |
| JP | 2000316439 | 11/2000 |
| WO | WO 97/05775 | 2/1997 |

* cited by examiner

LINE SPLICE USING BARB AND RECEIVER

BACKGROUND OF THE INVENTION

This invention relates in general to a device and method for linearly connecting strand materials and more particularly to a device which facilitates the connection of fishing lines.

In many types of fishing, and particularly in fly fishing, it is necessary or desirable to linearly connect sections of fishing line, either because of different properties of the sections or to repair a break. A fly fisherman must be equipped with a fishing rod, a fishing line called a fly line, a device such as a reel to hold the fly line, a leader line commonly called a leader, and flies. A leader is a relatively short, fine, tapered segment of monofilament line, with its larger or butt end attached to the fly line and its smaller or terminal end to the fly.

Fly fishing involves casting a line a substantial distance over a body of water wherein only the weight of the line is used to effect the cast. A skilled fly caster typically uses a tapered line and a tapered leader at the end of this line. One of the more difficult aspects of fly fishing involves connecting the end of the leader to the end of the fishing line by tying a knot. The knot must be specially selected to avoid kinks and/or slip-separation of the leader from the line.

Typically, a leader will range from as short as 5 or 6 feet to as long as 12 to 15 feet. Some leaders possess a true taper, that is, they undergo a gradual change in diameter from the butt end to the terminal end without any interruptions in the leader material. Other leaders consist of lengths of varying diameter leader material tied together. Many fishermen favor the latter, that is the knotted leader, in that it enables them to tailor the leader to their own needs. But irrespective of whether the fisherman uses a truly tapered leader or a knotted leader, the fisherman will usually find it necessary to replace the end section or segment of the leader, often called the tippet, for this is where the leader is thinnest and weakest, and where it will break if its capacity is exceeded. Tippet replacement and repair usually require a fisherman to form a knot. Moreover, when a fisherman changes to a smaller fly, a thinner tippet is often required. Hence, the typical fisherman must tie knots from time to time in leader material, which is usually monofilament line.

The knots which join the lengths of leader material either to the fly line or to other leader sections must accommodate the varying diameters of material and must be strong. Nail knots and Albright knots meet these requirement, but are time consuming to tie and require skill, good eyesight and considerable manual dexterity. Moreover, the knot is usually the weakest part of the fish line and may cause the breaking of the fish line at the knot.

Thus, there remains a need for a quick and easy device and method for strong linear connection of fishing lines.

BRIEF SUMMARY OF THE INVENTION

A splice system and method for linear connection of fishing lines include a female connector and a male connector. Each connector has first and second opposite ends and a longitudinal axis, about which the connector is symmetric. The first end of the female connector is connected to a first fishing line section and the second end has a first opening; the connector has an interior feature with a radial extent. The second end of the male connector is connected to a second fishing line section and the first end has a projection configured for coaxial insertion into the first opening of the female connector. The projection has a radial extent greater than the radial extent of the interior feature of the female connector. At least one of the connectors is resilient so that the projection compresses or the interior feature expands to allow passage of the projection axially past the interior feature.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principals of this invention. The figures may not be drawn to scale. Like reference numbers have been used throughout the figures to denote like parts.

DETAILED DESCRIPTION

Figure 1:
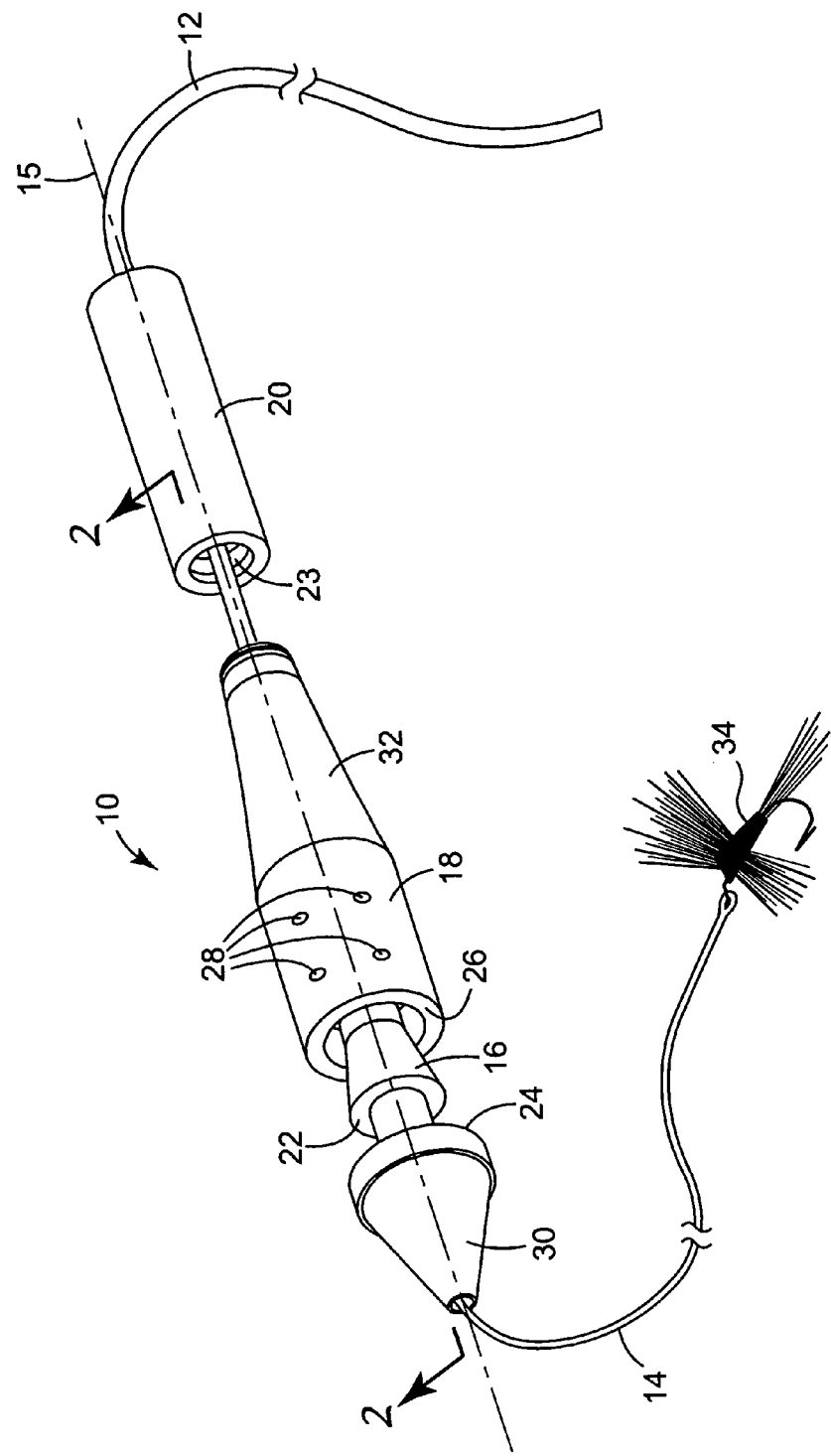
FIG. 1 is perspective view of one embodiment of the splice system of the present invention.

FIG. 1 is perspective view of one embodiment of the splice system of the present invention. Splice system 10 connects fly or fishing line 12 and leader 14 or other fishing line segments along longitudinal axis 15. Splice system 10 includes two main components: male connector or barb 16 and female connector or receiver 18, each of which is symmetric about axis 15. One embodiment additionally includes float 20.

Leader 14 is either permanently or removably secured to barb 16. Fly line 12 is either permanently or removably secured to receiver 18. FIG. 1 illustrates barb 16 partially inserted into, but not yet fully mated with, receiver 18. When barb 16 is fully inserted into receiver 18, flange or radially extending shoulder 22 facilitates a snap connection with an interior feature of receiver 18, forming a permanent, locking connection. When barb 16 and receiver 18 are fully connected (e.g. FIG. 4), radially extending stop surface 24 of barb 16 is disposed adjacent radially extending end surface 26 of receiver 18. In one embodiment, barb 16 and receiver 18 include tapered surfaces 30 and 32, respectively, to enhance the movement of splice system 10 through air and water.

When barb 16 and receiver 18 are fully connected, thereby connecting leader 14 to fly line 12, a fisherman can cast fly line 12 and leader 14 over the water to place fly 34 into the body of water. In an exemplary embodiment, a connected system 10 of barb 16 and receiver 18 is less than about 0.5 inch (12.7 mm) long and less than about 0.125 inch (3.2 mm) in diameter. In some embodiments, fly line 12 is about 0.032 inch (0.81 mm) to about 0.042 inch (1.07 mm) in diameter. In some embodiments, leader 14 is about 0.020 inch (0.51 mm) to about 0.026 inch (0.66 mm) in diameter. Splice system 10, with its low profile, small size, light weight, elongated shape and circular cross section is advantageous over other connection methods in that it is easy to use, very small, lightweight, and aero- and hydrodynamic. The shape and size allow a fly line 12 and leader 14 connected by splice system 10 to glide easily through air and water without disrupting the flow of the fishing line in casting. In an exemplary embodiment, barb 16 and receiver 18 are each molded from a lightweight, resilient and durable material such as plastic or nylon. Nylon 66, available from E.I. DuPont de Nemours and Co., Inc., Wilmington, Del., is used in one suitable embodiment.

In one embodiment, float 20 can be used with splice system 10 to provide buoyancy to the connection. In another embodiment, buoyancy is incorporated into barb 16 and/or receiver 18 by using buoyant materials or adding buoyant features such as dispersed hollow glass beads in the bulk material. Weep orifices 28 in an exemplary embodiment allow for the release of any water that seeps into receiver 18.

In one embodiment, float 20 is formed of a closed-cell or open-cell foam and can be configured as a cylinder having axial bore 23 through which fly line 12 can pass to secure float 20 onto fly line 12. In one exemplary embodiment, float 20 is formed of open-cell foam having a specific gravity of at least about 0.5. In another embodiment, float 20 is formed of extruded open-cell foam having a specific gravity of less than about 0.6. Float 20, when brightly colored, is functional as a strike indicator because it visibly signals movement of the leader and fly during a fish strike.

In some applications, float 20 is not used because a sinking line is preferred. In that case, sinking ingredients such as tungsten powder can be incorporated into barb 16 and/or receiver 18, or a sinking member may be used in place of float 20, or orifices 28 may be omitted or plugged. Moreover, the sinking member or float 20 may be colored to render it highly visible by day or night or camouflaged, as desired. Other treatments for the components of splice system 10 include protection against ultraviolet light.

Figure 2:
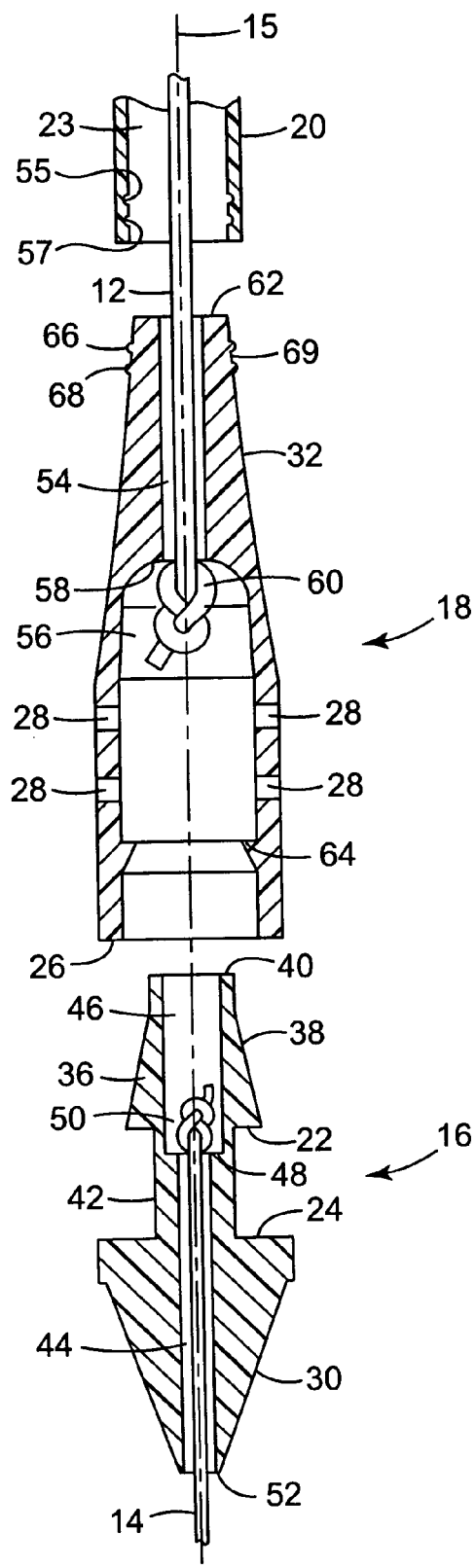
FIG. 2 is a cross-sectional view along line 2—2 of FIG. 1, showing the two connectors of the splice system in a disconnected configuration.

FIG. 2 is a cross-sectional view along line 2—2 of FIG. 1, showing the two connectors of the splice system in a disconnected configuration. In an exemplary embodiment, all features of barb 16 and receiver 18 are symmetrically disposed about axis 15. Barb 16 includes projection 36, which is symmetric about axis 15. Projection 36 has tapered surface 38 having a narrow width at first end 40 of barb 16 and gradually widening to terminate at radial shoulder 22. A narrow neck 42 is disposed on barb 16 between radial shoulder 22 and stop surface 24. In one embodiment, barb 16 includes axial bore 44 and cavity 46 which intersect at interior radially extending shoulder 48. In an exemplary embodiment, axial bore 44 is large enough to allow the passage of leader 14 but not wide enough to allow the passage of knot 50 in leader 14. In an exemplary embodiment, cavity 46 is wide and deep enough to accommodate knot 50. In the illustrated embodiment, leader 14 is removably connected to barb 16. A user threads leader 14 through axial bore 44 from second end 52 of barb 16 to first end 40 of barb 16. After pulling leader 14 through first end 40, the user ties the end of leader 40 into knot 50. If leader 14 extends beyond knot 50, the user can trim off the extra length if desired. Then, the user pulls back on leader 14 to seat knot 50 against shoulder 48.

In the illustrated embodiment, receiver 18 includes axial bore 54 and cavity 56, which intersect at shoulder 58. Axial bore 54 is large enough to allow the passage of fly line 12 but not wide enough to allow the passage of knot 60 formed at the end of fly line 12. Additionally, cavity 56 is wide enough to accommodate knot 60 and deep enough to accommodate knot 60 and protrusion 36 of barb 16. To attach fly line 12 to receiver 18, a user threads fly line 12 from first end 62 of receiver 18 through second end 26. The user than ties knot 60 in fly line 12. If excess fly line 12 extends beyond knot 60, the user can trim off the extra length if desired. The user then pulls fly line 12 back in the direction of first end 62 to seat knot 60 against shoulder 58. With fly line 12 thereby connected to receiver 18 and leader 14 connected to barb 16, fly line 12 and leader 14 can be connected to each other by moving projection 36 of barb 16 along axis 15 into cavity 56 of receiver 18. A permanent snap connection is facilitated by inserting radial shoulder 22 of barb 16 past an interior feature such as raised annulus 64 on the interior surface of receiver 18.

In one embodiment, barb 16 and receiver 18 include tapered surfaces 30 and 32, respectively, to enhance the movement of splice system 10 through air and water. Tapered surface 30 is symmetric about axis 15 and extends from a narrow diameter near second end 52 of barb 16 to a greater diameter toward stop surface 24. Tapered surface 32 is symmetric about axis 15 and extends from a narrow diameter near first end 62 of receiver 18 to a greater diameter toward second end surface 26.

In one embodiment, receiver 18 also includes exterior raised annuli 66 and 68 forming an annular groove 69 therebetween on the exterior of the receiver 18. Annuli 66 and 68 are provided to facilitate gripping and also for mating with grooves 55 and 57 of float 20 to positionally fix slidably mounted float 20. In another embodiment, a depressed or recessed annular groove is provided on the exterior of receiver 18 to mate with a corresponding raised annulus on float 20.

Figure 3A:
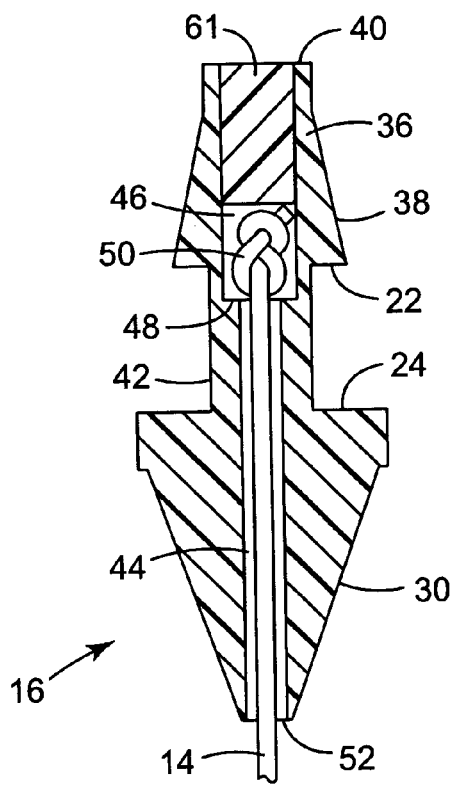
FIG. 3A is a cross-sectional view of another embodiment of a male connector of the splice system.

FIG. 3A is a cross-sectional view of another embodiment of barb 16. In the illustrated embodiment, leader 14 is attached to barb 16 during manufacturing with knot 50 or similar mechanism. Filler or plug 61 is inserted during manufacture to permanently secure leader 14 in barb 16.

Figure 3B:
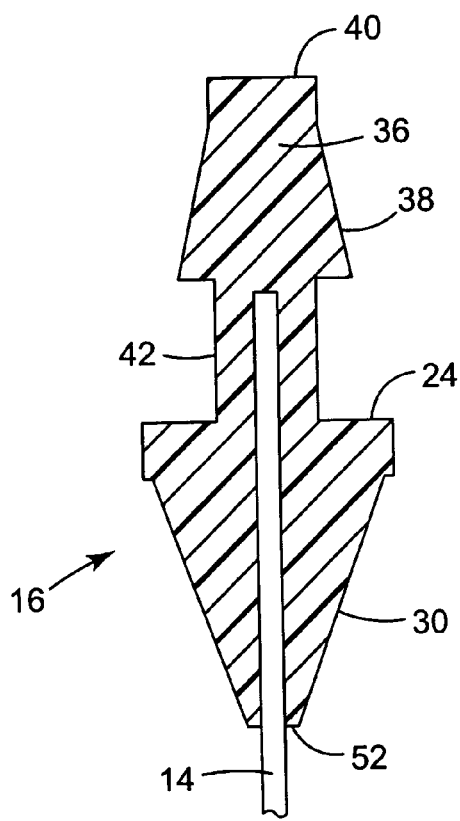
FIG. 3B is a cross-sectional view of yet another embodiment of a male connector of the splice system.

FIG. 3B is a cross-sectional view of yet another embodiment of a connector of the splice system. In the illustrated embodiment, leader 14 is integrally formed with barb 16 so that axial bore 44, cavity 46 and knot 50 are eliminated. This can be accomplished, for example, by molding barb 16 over leader 14 so that they form an inseparable unit.

Figure 4:
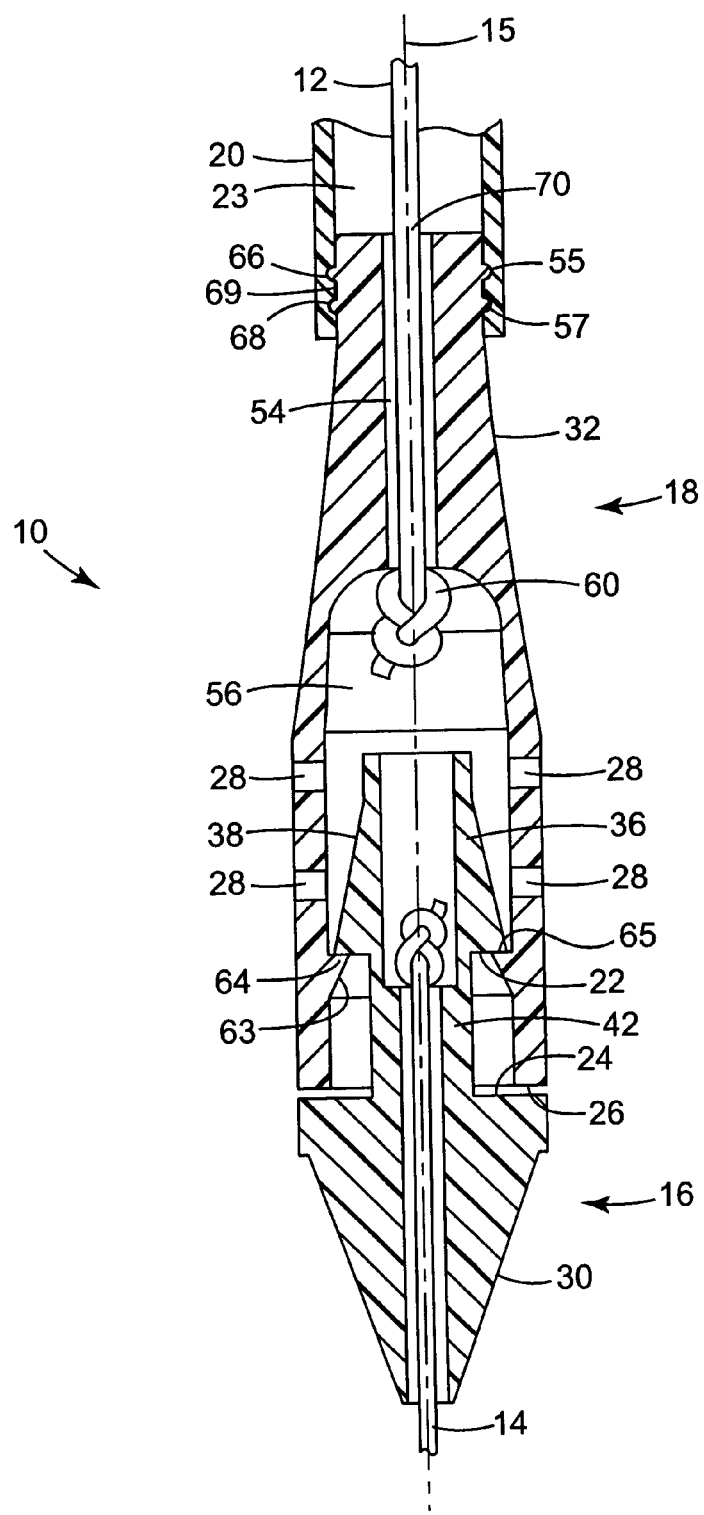
FIG. 4 is a cross-sectional view of the two connectors of FIG. 2 in a connected configuration.

FIG. 4 is a cross-sectional view of the two connectors and float 20 of FIG. 2 in a connected configuration. In one exemplary embodiment, as projection 36 is advanced from end 26 of receiver 18 past interior annulus 64, tapered surface 38 of projection 36 facilitates a resilient expansion of the diameter of annulus 64 to allow the passage of projection 36 axially past annulus 64. A radial extent, such as half of an outer diameter, of radial shoulder 22 of projection 36 is greater than a radial extent, such as half of an inner diameter, of annulus 64 in an unexpanded state. When radial shoulder 22 has passed annulus 64, an audible snap or click is heard as annulus 64 resiliently returns to its unexpanded dimension. In particularly suitable embodiments, either one or both of projection 36 and annulus 64 resiliently deform to allow radial shoulder 22 to move past annulus 64 and then return to about the original dimension.

Such resilient deformation can be accomplished by the choice of materials and the geometry of barb 16 and receiver 18.

Annulus 64 has a tapered surface 63 to facilitate the advance of projection 36 into cavity 56. In an exemplary embodiment, annulus 64 has a flat surface 65 which projects radially inward and faces radial shoulder 22 to prevent radial shoulder 22 from slipping back past annulus 64. An outer diameter of radial shoulder 22 is slightly larger than an inner diameter of cavity 56 at flat surface 65 of annulus 64 to facilitate an interference fit of projection 36 in receiver 18, thereby leading to an even more secure connection. In a particularly suitable embodiment, flat surface 65 is slightly undercut (i.e., moving radially outward from axis 15, flat surface 65 slopes toward end surface 26) so that annulus 64 forms an annular barb which further prevents the disconnection of barb 16 and receiver 18.

After projection 36 has passed annulus 64, stop surface 24 of barb 16 contacts end surface 26 of receiver 18, and barb 16 and receiver 18 are fully engaged. Cavity 56 is sized to allow for the insertion of projection 36 without interference with knot 60. After the connection of barb 16 and receiver 18, knot 60 is trapped within splice system 10. Because the outer diameter of radial shoulder 22 is greater than the inner diameter of annulus 64, the passage of projection 36 into cavity 56 forms a permanent and strong connection between barb 16 and receiver 18, thereby connecting leader 14 and fly line 12. In an exemplary embodiment, projection 36 at first end 40 has an outside diameter of about 0.066 inch (1.68 mm); projection 36 at radial shoulder 22 has an outside diameter of about 0.104 inch (2.64 mm); bore 56 has a largest inner diameter of about 0.106 inch (2.69 mm); and annulus 64 has an inner diameter of about 0.094 inch (2.39 mm). In each instance, a radial extent is half of the diameter.

In an exemplary embodiment, the materials and dimensions of barb 16 and receiver 18 are chosen so that barb 16 and receiver 18 cannot be separated with manual tensile or separation force along axis 15 of at least about 8 pounds (3.6 kg). In an especially suitable embodiment, barb 16 and receiver 18 cannot be separated with tensile or separation force along axis 15 of at least about 10 pounds (4.5 kg). Nylon is an especially suitable material for barb 16 and receiver 18 because it swells slightly in water, leading to an even stronger interference connection between barb 16 and receiver 18. In one embodiment, an adhesive such as a water-activated adhesive, may be disposed in cavity 56 or on the surface of projection 36 to further adhere barb 16 and receiver 18 together.

To initially use splice system 10, a user first attaches leader 14 to barb 16 with knot 50 as discussed above with reference to FIG. 2. If barb 16 is of the type illustrated in FIG. 3A or FIG. 3B, this step is omitted. If float 20 is used, a user strings fly line 12 through bore 23 of float 20. The user attaches fly line 12 to receiver 18 as discussed above. Float 20 is secured onto receiver 18 by engaging grooves 55 and 57 of float 20 with annuli 66 and 68 of receiver 18, respectively. The user attaches leader 14 to fly line 12 by inserting barb 16 into receiver 18 to form a permanent, locked connection.

To replace leader 14 with a different leader 14, the user removes the old leader 14 by cutting fly line 12 at severance point 70. Leader 14 can be discarded along with barb 16, receiver 18 and the knotted end of fly line 12. The user can take the new severed end of fly line 12 and attach it to a new receiver 18 by inserting it through axial bore 54 and tying knot 60 as explained above. Thus, a fisher should be supplied with multiple receivers 18 and multiple sets of leaders 14 with attached barbs 16.

Figure 5:
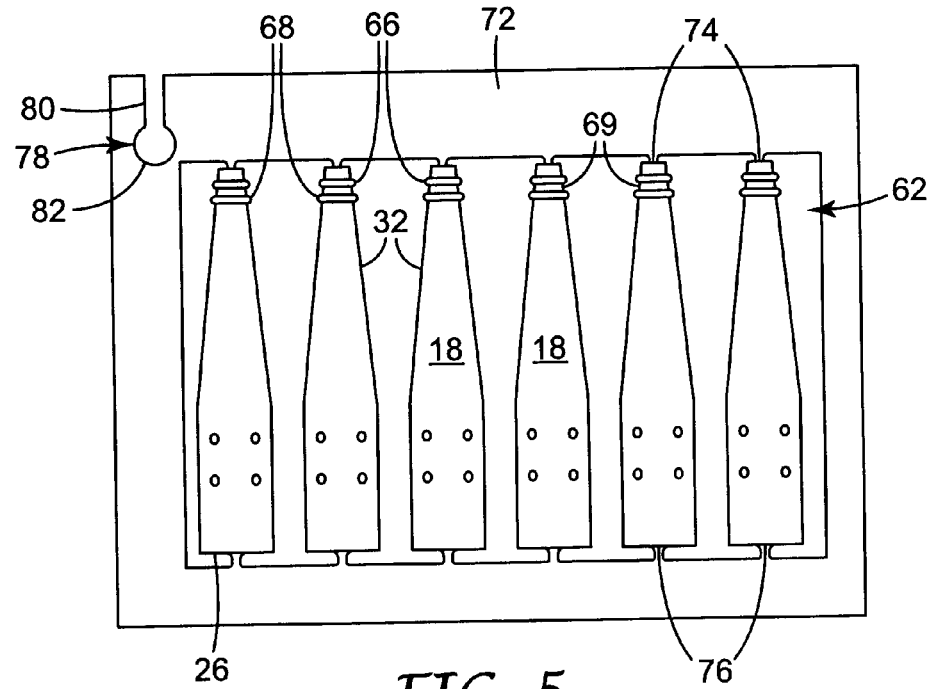
FIG. 5 is a side elevation view of a card holding multiple female connectors.

FIG. 5 is a side elevation view of a card holding multiple female connectors 18. Card 72 provides for convenient storage of, and easy accessability to, receivers 18. Card 72 is easily stored in a user's vest pocket, providing a convenient storage unit for receivers 18, which might otherwise be easily lost because of their small size. An added convenience is that a user can thread fly line 12 through receiver 18 and tie knot 60 while the receiver 18 is held on card 72, thus reducing the risk of dropping and losing the receiver 18 while tying on fly line 12. In one embodiment, receivers 18 are integrally molded with card 72, leaving connecting members 74 and 76 at end 62 and end 26 of each receiver 18, respectively.

Figure 6:
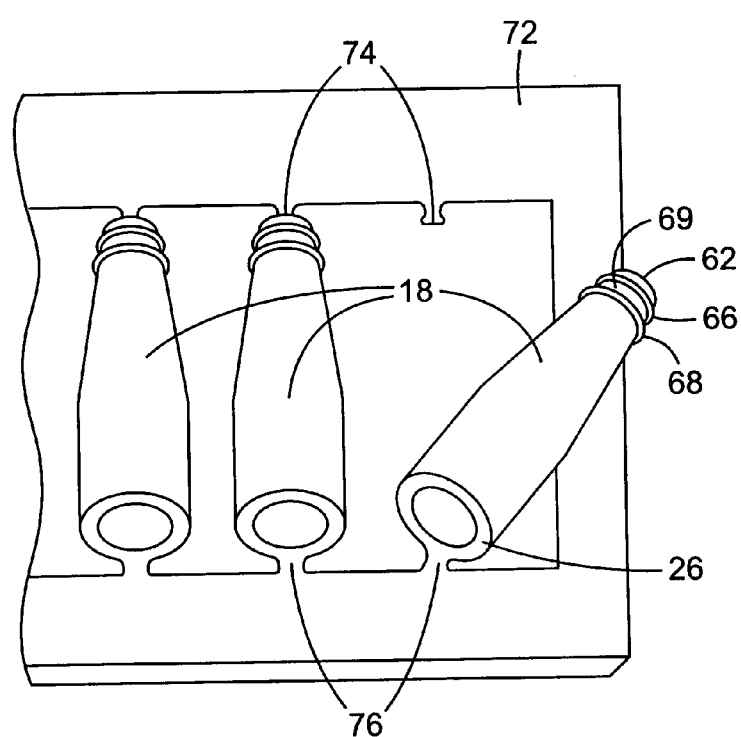
FIG. 6 is a partial perspective view of the removal of one female connector from the card of FIG. 5.

FIG. 6 is a partial perspective view illustrating the removal of one receiver 18 from card 72. In one embodiment, each connecting member 74 and 76 secures the respective receiver 18 to card 72 during routine handling, but is easily broken with manual force for the removal of a receiver 18 from card 72.

Figure 7:
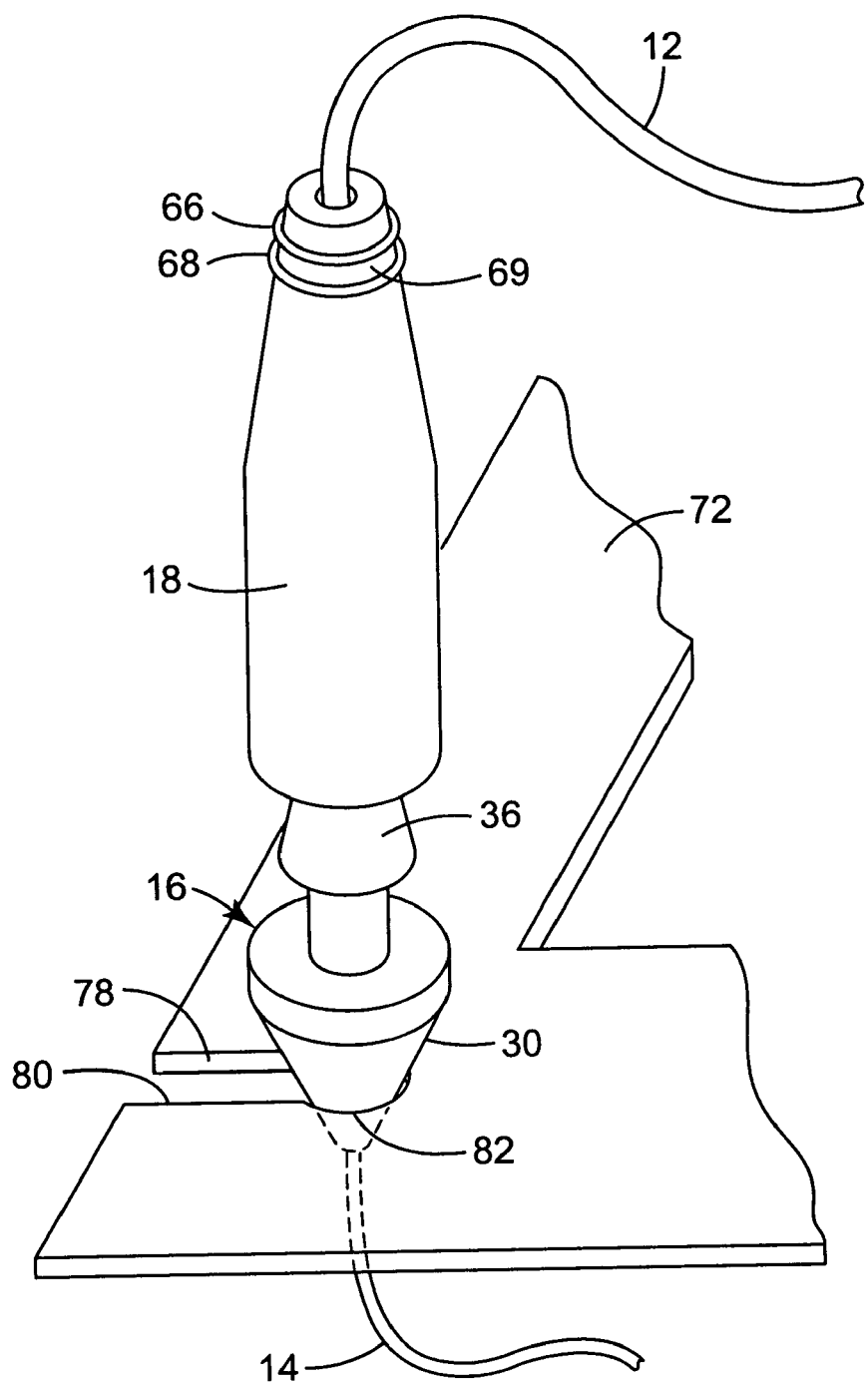
FIG. 7 is a partial perspective view illustrating use of a connector holding tool disposed on the card of FIG. 5.

FIG. 7 is a partial perspective view illustrating use of a tool 78 disposed on card 72. In one embodiment, tool 78 includes slot 80 and circular bore 82. Tool 78 can be used to facilitate the insertion of projection 36 of barb 16 into receiver 18. In one method of use, a user slides leader 14 through slot 80 to bore 82 so that tapered surface 30 of barb 16 rests in bore 82. With barb 16 thus held, the user can then force receiver 18 onto projection 36 to snap barb 16 and receiver 18 together. Tool 78 is especially helpful because of the difficulty of handling a very small barb 16 and the amount of force necessary to force projection 36 of barb 16 past interior raised annulus 64 of receiver 18.

Although the present invention has been described with reference to preferred embodiments, workers skilled in the art will recognize that changes may be made in form and detail without departing from the spirit and scope of the invention.

What is claimed is:

1. A splice system for linear connection of fishing lines, the system comprising:
    a female connector having first and second opposite ends and a longitudinal axis, the first end connected to a first fishing line section and the second end having a first opening therein, the connector having an interior feature with a radial extent, wherein the female connector is removably connected to the first fishing line section, the female connector having an axial bore in the first end having a diameter greater than a diameter of an end of the first fishing line section and less than a diameter of a knot formed at the end of the first fishing line; and
    a male connector having first and second opposite ends and a longitudinal axis, the second end connected to a second fishing line section and the first end having a projection thereon configured for coaxial insertion into the first opening of the female connector, the projection having a radial extent greater than the radial extent of the interior feature of the female connector;
    wherein at least one of the connectors is resilient so that the projection compresses or the interior feature expands to allow passage of the projection axially past the interior feature.

2. The splice system of claim 1 wherein the female connector is removably connected to the first fishing line section.

3. The splice system of claim 1 wherein the projection has a first end at the first end of the male connector and an opposite second end and wherein the projection tapers from a smallest diameter at the first end of the projection to a larger diameter at the second end of the projection.

4. The splice system of claim 3 further comprising a neck on the male connector adjacent the second end of the projection, a surface between the neck and the second end of the projection forming a radial shoulder.

5. The splice system of claim 1 wherein the interior feature is a raised interior annulus.

6. The splice system of claim 5 further comprising a tapered surface disposed on the raised interior annulus, the tapered surface facing the second end of the female connector.

7. The splice system of claim 5 further comprising a radially extending flat surface disposed on the raised interior annulus, the flat surface facing the first end of the female connector.

8. The splice system of claim 1 further comprising a radially extending stop member disposed on the male connector which faces the first end of the female connector when the male connector is connected to the female connector.

9. The splice system of claim 8 wherein the male connector tapers from a larger diameter adjacent the stop member to a smaller diameter at the second end of the male connector.

10. The splice system of claim 1 wherein the male connector is permanently connected to the second fishing line.

11. The splice system of claim 1 wherein the male connector is removably connected to the second fishing line section.

12. The splice system of claim 11 further comprising:
an axial bore in the second end of the male connector having a diameter greater than a diameter of an end of the second fishing line section and less than a diameter of a knot formed at the end of the second fishing line.

13. The splice system of claim 1 further comprising a float disposed on one of the fishing line sections.

14. A splice system for linear connection of fishing lines, the system comprising:
a female connector having first and second opposite ends and a longitudinal axis, the connector being symmetric about the axis, the first end connected to a first fishing line section and the second end having a first opening therein, the connector having an interior feature with a radial extent, wherein the female connector is removably connected to the first fishing line section, the female connector having an axial bore in the first end of the female connector having a diameter greater than a diameter of an end of the first fishing line section and less than a diameter of a knot formed at the end of the first fishing line; and
a male connector having first and second opposite ends and a longitudinal axis, the connector being symmetric about the axis, the second end connected to a second fishing line section and the first end having a projection thereon configured for coaxial insertion into the first opening of the female connector, the projection having a radial extent greater than the radial extent of the interior feature of the female connector;
wherein at least one of the connectors is resilient so that the projection compresses or the interior feature expands to allow passage of the projection axially past the interior feature.

15. A splice system for linear connection of fishing lines, the system comprising:
a female connector having first and second opposite ends and a longitudinal axis, the connector being symmetric about the axis, the first end connected to a first fishing line section and the second end having a first opening therein, the connector having an interior feature with a radial extent, and further comprising a plurality of weep orifices disposed on the female connector; and
a male connector having first and second opposite ends and a longitudinal axis, the connector being symmetric about the axis the second end connected to a second fishing line section and the first end having a projection thereon configured for coaxial insertion into the first opening of the female connector, the projection having a radial extent greater than the radial extent of the interior feature of the female connector;
wherein at least one of the connectors is resilient so that the projection compresses or the interior feature expands to allow passage of the projection axially past the interior feature.

16. A method for linear connection of fishing lines comprising:
providing a female connector having first and second opposite ends and a longitudinal axis, the first end connected to a first fishing line section and the second end having a first opening therein, the connector having an interior feature with a radial extent, in which the step of providing a first fishing line section connected to a female connector includes passing an end of the first fishing line through an axial bore in the female connector and knotting the end of the first fishing line;
providing a male connector having first and second opposite ends and a longitudinal axis, the second end connected to a second fishing line section and the first end having a projection thereon configured for coaxial insertion into the first opening of the female connector, the projection having a radial extent greater than the radial extent of the female connector;
inserting the male connector into the first opening of the female connector; and
moving the radial extent of the projection of the male connector axially past the interior feature of the female connector.

17. The method of claim 16 in which the step of providing a second fishing line section connected to a male connector includes passing an end of the second fishing line through an axial bore in the male connector and knotting the end of the second fishing line.

18. A method for linear connection of fishing lines comprising:
providing a female connector having first and second opposite ends and a longitudinal axis, the connector being symmetric about the axis, the first end connected to a first fishing line section and the second end having a first opening therein, the connector having an interior feature with a radial extent, in which the step of providing a first fishing line section connected to a female connector includes passing an end of the first fishing line through an axial bore in the female connector and knotting the end of the first fishing line;
providing a male connector having first and second opposite ends and a longitudinal axis, the connector being symmetric about the axis, the second end connected to a second fishing line section and the first end having a projection thereon configured for coaxial insertion into the first opening of the female connector, the projection having a radial extent greater than the radial extent of the female connector;

inserting the male connector into the first opening of the female connector; and moving the radial extent of the projection of the male connector axially past the interior feature of the female connector.

19. The method of claim 18 further comprising:

providing a plurality of the female connectors on a card; and separating one of the female connectors from the card after knotting the end of the first fishing line.

20. The method of claim 19 further comprising:

inserting an end of the male connector into a slot disposed on the card to thereby hold the male connector prior to inserting the male connector into the female connector.

21. The method of claim 18 further comprising:

providing a float having an axial bore; and passing the end of the first fishing line through the bore of the float prior to passing the end of the first fishing line through the bore of the female connector.

22. A method for replacing a fishing line section comprising:

providing a first fishing line section connected to a female connector;

providing a second fishing line section connected to a male connector, the male connector being connected to the female connector;

cutting the first fishing line and discarding the female connector with a severed portion of the first fishing line, the male connector, and the second fishing line section;

passing a cut end of the first fishing line through an axial bore in a second female connector and knotting the end of the first fishing line, the second female connector having first and second opposite ends and a longitudinal axis, the connector being symmetric about the axis, the second end having a first opening therein, the connector having an interior feature with a radial extent;

providing a second male connector having first and second opposite ends and a longitudinal axis, the connector being symmetric about the axis, the second end connected to a third fishing line section and the first end having a projection thereon configured for coaxial insertion into the first opening of the second female connector, the projection having a radial extent greater than the radial extent of the interior feature of the second female connector;

inserting the second male connector into the first opening of the second female connector; and moving the radial extent of the projection of the second male connector axially past the interior feature of the second female connector.

* * * * *

UNITED STATES PATENT AND TRADEMARK OFFICE
CERTIFICATE OF CORRECTION

PATENT NO. : 6,910,296 B2
DATED : June 28, 2005
INVENTOR(S) : Blette, Russell E.

It is certified that error appears in the above-identified patent and that said Letters Patent is hereby corrected as shown below:

<u>Column 8,</u>
Line 12, after "axis" insert -- , --.

Signed and Sealed this

Twenty-seventh Day of December, 2005

JON W. DUDAS
*Director of the United States Patent and Trademark Office*